Sept. 15, 1931.          S. D. WELLS          1,823,014
PROCESS OF MANUFACTURING ALCOHOL BY FERMENTATION
Filed May 11, 1927
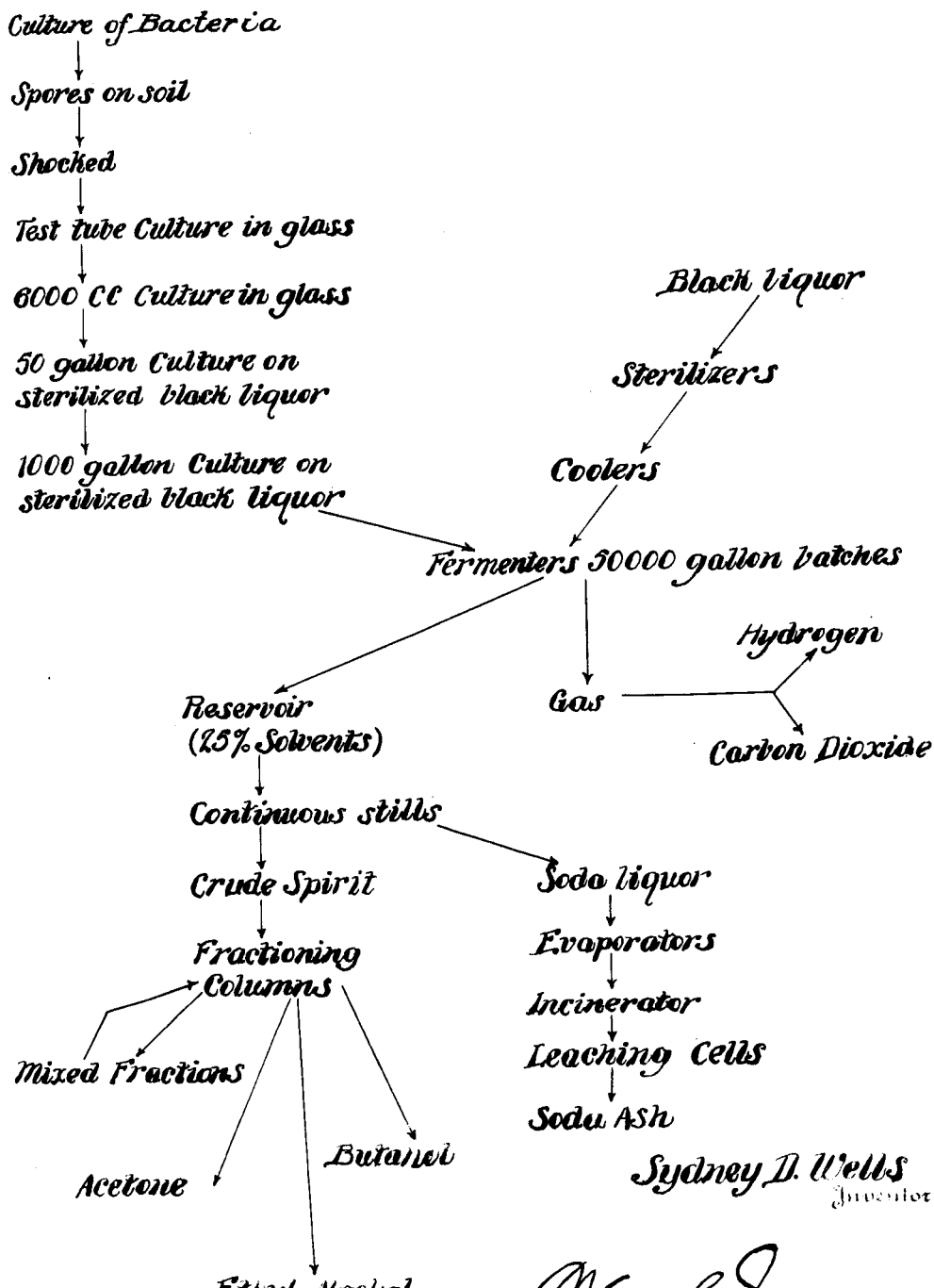

Patented Sept. 15, 1931

1,823,014

UNITED STATES PATENT OFFICE

SIDNEY D. WELLS, OF QUINCY, ILLINOIS, ASSIGNOR TO PAPER MILL LABORATORIES, INC., OF QUINCY, ILLINOIS, A CORPORATION OF ILLINOIS

PROCESS OF MANUFACTURING ALCOHOL BY FERMENTATION

Application filed May 11, 1927. Serial No. 190,556.

This invention relates to the production of alcohols by fermentation which is carried on under conditions particularly conducive to vigorous action in a mash rich in carbohydrate and nitrogenous matter.

The invention is particularly directed to an improvement of the mash material and conditions of fermentation to effect a large yield of fermented product, whether it be alcohol, ketones or an aldehyde or other product obtainable by fermentation. This improvement is brought about by using a certain material as the basis of the bulk of the mash. This particular material is the spent cooking liquor remaining after fibrous vegetable material has been cooked with certain particular mild cooking agents and the liquor has a neutral or only slightly acid reaction.

In cooking straw or other fibrous plant material with mild cooking agents such as sodium carbonate, sodium sulphite, sodium sulphide and the like or mixtures of the same for the production of paper pulp the spent cooking liquors are neutral or only slightly acid or may be readily rendered only slightly acid and they are rich in carbohydrate and nitrogenous vegetable material. They are consequently capable of supporting numerous bacterial, fungus and other growths which produce various materials such as aliphatic alcohols, acids, aldehydes, ketones, esters, carbon dioxide, hydrogen, ammonia, and others, depending on what particular growth or growths predominate. By using pure cultures and sterilized liquor and equipment, the number of products produced may be limited closely to the particular ones desired, and thus results are possible similar to those obtained from the treatment of starchy material in the production of grain alcohol, acetic acid, and others.

It is of the utmost importance that the material of the mash used in this present invention have the qualities, ingredients and general characteristics herein defined. A strong cooking liquor such as that from caustic processes is not suitable, nor is the sugar containing material resultant of the so-called sulphite cooking satisfactory for the purposes of the present invention.

On the attached drawing there is illustrated a flow sheet showing the several steps of the present invention. According to this chart, the microorganism is specified as *Clostridium acetobutylicum*. A culture is prepared of the desired bacteria and the spores are developed on soil, after which the culture is shocked. Shocked is the term used to identify the technic in which the bacteria under consideration, which happen to be spore forming bacteria, are developed on sterile soil under unfavorable conditions so that they immediately go into the spore stage. When in that stage they can withstand high temperatures which kill all vegetative forms not capable of surviving the treatment. Most organisms which could contaminate the culture do not form spores and are therefore eliminated at temperatures above 80° C. Such temperature treatment and elimination of undesirable forms thus constitutes shocking and the present invention is not specifically directed to these details. Test tube cultures are prepared and about six thousand cc. are prepared in glass. A fifty gallon culture is prepared on sterilized spent cooking liquor of the type used in this invention and from this quantity a one thousand gallon culture is prepared with sterilized spent cooking liquor. Separately from the foregoing, a large amount of spent cooking liquor in batches of approximately fifty thousand gallons is first sterilized and then passed through coolers and then placed in the fermenting apparatus and at this stage, the above mentioned one thousand gallon culture is incorporated and the fermenting conducted in the sterilized and cooled mash thus consisting of the spent cooking liquor. From the fermenters the liquid containing the desired products is drawn off or otherwise separated and led to a reservoir from which it is conducted to stills from which a crude spirit is obtainable. The crude spirit is subsequently fractionated and acetone, alcohol and butanol and various mixed fractions are obtainable. The alcohol is ethyl alcohol or the product may be otherwise specifically predetermined, as desired.

Other incidental products are obtainable during the fermentation and subsequent treatment. At the fermenters the gas driven off includes carbon dioxide and hydrogen, both of which can be used. From the stills a soda liquor is obtained and this can be converted to soda ash by subsequent treatment in evaporators, incinerators and leaching cells.

An example in the production of the solvents butanol, acetone, and ethyl alcohol will be understood from the following procedure. The black liquor obtained from washing cereal straw cooked with a solution of sodium carbonate and sulphur is sterilized and inoculated with a culture of the desired microorganism and allowed to ferment at a temperature of 98° F. until the evolution of gas ceases, a period of approximately sixty hours. The solution is then passed through continuous stills which yield a crude spirit consisting of about fifty percent mixture of butanol, acetone, and ethyl alcohol in water. These constituents are separated in fractionating columns as above outlined in connection with the accompanying drawing.

One of the important phases of this invention is the preparation of a nutrient solution capable of sustaining yeast and bacteria for the production of organic substances. Thus the invention may in part be considered directed toward the treatment of straw or other vegetable material for the production of the necessary nutrient solution. In preparing the mash, thus consisting of the cooking liquor specifically defined or of wash water resultant of washing fibrous plant material after such cooking, straw may be treated with a milk of lime solution containing approximately ten percent of the weight of the straw CaO or it may be treated with a solution containing five percent of its weight $Na_2CO_3$ and one-half percent S, or it may be treated with a solution containing seven percent $Na_2CO_3$ and one and one-half percent $Na_2SO_3$, or it may be treated with a solution containing three percent NaOH and two percent $Na_2S$. In each case it is cooked in a digestor at a temperature of about 250° F. for ten hours. The contents are then emptied and the water soluble matter washed from the residue. Where milk of lime is used it is necessary to neutralize the liquors obtained with $H_2SO_4$ or $NaHSO_4$ or some other acid or acid salt with a divalent or tri-valent acid until the right hydrogen ion concentration is obtained most favorable to the growth of yeast or whatever bacteria is used. In the case of cooking solutions in which sodium salts are used the liquors obtained are usually approximately the right hydrogen ion concentration and may be made exactly so by means of acid or alkali. The treatment of the solution with yeast and the distillation of the products obtained are carried on according to the methods known to those versed in the art.

Where fibrous vegetable material is used, the residue obtained from the digestion mentioned above may be used in the manufacture of paper, paperboard or other fibrous products according to methods known to those versed in the art.

In a somewhat different treatment, straw may be treated with a solution containing from five to ten percent of its weight in soda ash or in a solution containing from four to ten percent of its weight of caustic soda. The other cooking conditions would be the same as above specified. Different amounts require different cooking conditions. The amount of cooking reagent may be varied greatly and depends on the relative value of the solvents obtainable from the spent cooking liquor and the straw-board obtained from the fibrous residue. It has been noticed that the greater the amount of cooking material and the more severe the cooking conditions there results a correspondingly greater amount of straw matter dissolved in the liquor and the smaller the amount of fibrous residue.

It is important that the cooking step be alkaline or a neutral digestion and in this feature, the present process is to be differentiated from fermentation of materials requiring the presence of sugar, as for example, those in which waste sulphite liquors resultant from the cooking of wood have been used and the fermentation is confined probably solely to sugars which can exist in an acid digestion. In the present mash there is probably little or no sugar. The substances which render the liquor of the mash of the present invention particularly important for fermentation purposes are peculiar in that these materials are not derived from cellulose but actually occur with the cellulose in the plant and are obtained without any breaking down of the cellulose to sugar as is the condition occurring in the bisulphite process.

The waste liquors obtained from the mild cooking of various straws, bagasse, bamboo, grasses and the like are particularly suitable to bacterial growth. Should there be slight alkalinity, this can be counteracted by the addition of acids or acid salts prior to the addition of the ferment to the mash. Suitable examples of acidifying materials are sulphuric acid, phosphoric acid, carbonic acid, sodium acid sulphate or monocalcium phosphate or calcium superphosphate and these materials may be used to bring about the condition of slight acidity normally desirable for bacterial growth. The vegetable fibrous material may be digested primarily for the production of these fermentable solutions and the fiber used for paper only as a by-product, or the cooking material may be used for the mash of the present invention after the usual cooking operation in the production of paper.

The exact nature of the ingredients of the vegetable fibrous material which render the cooking material of particular importance in fermentation processes is difficult to determine. The material undoubtedly includes semi-celluloses and pentosans, normally found in straw and similar vegetation, and also albuminous matter and mucilaginous substances similar to pectin. All of these materials differ considerably from sugars, and such other carbohydrates obtainable from severe cooking treatment of wood such as referred to hereinbefore as providing a strong acid or strong alkali treatment.

The conditions prescribed in the foregoing for the cooking reagent are typical, but the present process is not limited to the particular cooking materials mentioned. Quite a wide variation of cooking materials may be used. However, it is of major importance that the cooking be mild and that the action be terminated before the vegetable material is pulped and approximately as soon as it is softened, as contrasted to being pulped. Thus the cooking material is substantially the same kind and strength of cooking reagent as I have defined for use for the treatment of vegetable fibrous material for the production of pulp by two stages, including first a mild cooking to effect softening as contrasted to pulping and secondly, a treatment of the softened fibers by mechanical means to effect their separation and all of which features have been defined in my Patents 1,626,171, April 26, 1927, 1,654,624, January 3, 1928, and 1,714,459, May 1, 1929.

The invention relating to the manufacture of distillable spirits by fermentation is claimed in divisional application Serial No. 545,125, filed June 17, 1931.

I claim:—

1. The process of manufacturing distillable spirits by fermentation which process comprises fermenting a mash consisting of the liquor resultant from the cooking of fibrous plant material with a solution of an alkaline carbonate and an alkaline sulphite until the fibrous plant material is softened but not pulped, and thereby producing recoverable distillable spirits.

2. The process of manufacturing distillable spirits by fermentation which process comprises preparing a mash consisting solely of the liquor resultant from the cooking of fibrous plant material with a solution of an alkaline carbonate and an alkaline sulphite until the fibrous plant material is softened but not pulped, adding water to said liquor, slightly acidifying the mixture prior to addition of the ferment to counteract normal alkalinity of the cooking liquor, fermenting the mash so prepared and thereby producing recoverable distillable spirits.

3. The process of manufacturing distillable spirits by fermentation which process comprises fermenting a mash consisting of a liquor resultant from the cooking of fibrous plant material with mild cooking agents including in solution an alkaline carbonate and an alkaline sulphur compound until the fibrous plant material is softened but not pulped, and said liquor including hemicelluloses, pentosans, albuminous and mucilaginous matter, and thereby producing recoverable distillable spirits.

4. The process of manufacturing distillable spirits by fermentation which process comprises fermenting a mash consisting of the liquor resulting from washing fibrous plant material after the same has been cooked with a mild cooking agent comprising an alkaline carbonate and an alkaline sulphite, slightly acidifying the liquor prior to the incorporation of the ferment, fermenting the mash so prepared and thereby producing recoverable distillable spirits.

5. The process of manufacturing distillable spirits by fermentation which process comprises fermenting a mash consisting solely of the liquor resultant from the cooking of fibrous plant material with a mild cooking agent comprising a solution of sodium sulphite and an alkaline carbonate until the fibrous plant material is softened but not pulped, and thereby producing recoverable distillable spirits.

6. The process of manufacturing chemicals by fermentation which process consists of preparing a culture of a micro-organism in an amount of the liquor resultant from the cooking of fibrous plant material with a mild cooking agent including in solution sodium sulphite and an alkaline carbonate until the fibrous plant material is softened but not pulped, incorporating the culture in a large amount of the same kind of liquor and permitting fermentation to take place, and thereby producing recoverable distillable spirits.

7. The process of manufacturing distillable spirits by fermentation which process comprises fermenting a mash consisting of the liquor resultant from the cooking of fibrous plant material with a solution of a sodium carbonate and an alkaline sulphur compound until the fibrous plant material is softened but not pulped, and thereby producing recoverable distillable spirits.

8. The process of manufacturing distillable spirits by fermentation which process comprises fermenting a mash consisting of the liquor resultant from the cooking of fibrous plant material with a solution of sodium carbonate until the fibrous plant material is softened but not pulped, and thereby producing recoverable distillable spirits.

9. The process of manufacturing distillable spirits by fermentation which process consists of fermenting a mash comprising the liquor resultant from the cooking of fibrous plant material with a mild cooking agent having in water a mild alkaline reaction and which cooking is conducted until the fibrous plant material is softened but not pulped, and thereby producing recoverable distillable spirits.

In testimony whereof I affix my signature.

SIDNEY D. WELLS.